United States Patent [19]
Lee et al.

[11] Patent Number: 5,805,246
[45] Date of Patent: Sep. 8, 1998

[54] METHODS OF MANUFACTURING LIQUID CRYSTAL DISPLAY DEVICES WITH REDUCED SUSCEPTIBILITY TO ELECTROSTATIC DISCHARGE FAULTS

[75] Inventors: Jung-Hee Lee, Kyunggi-do; Kweon-Sam Hong, Seoul, both of Rep. of Korea

[73] Assignee: Samsung Electronics Co., Ltd., Rep. of Korea

[21] Appl. No.: 855,301

[22] Filed: May 13, 1997

[30] Foreign Application Priority Data

Aug. 7, 1996 [KR] Rep. of Korea .................. 1996-32853

[51] Int. Cl.⁶ ....................... G02F 1/1333; G02F 1/1345; G02F 1/13
[52] U.S. Cl. ............................. 349/40; 349/150; 349/187
[58] Field of Search .............................. 349/40, 149, 150, 349/187

[56] References Cited

U.S. PATENT DOCUMENTS

| | | | |
|---|---|---|---|
| 5,327,267 | 7/1994 | Aoki et al. | 349/40 |
| 5,353,142 | 10/1994 | Dodd | 349/187 |
| 5,504,348 | 4/1996 | Yoshida et al. | 349/43 |
| 5,668,032 | 9/1997 | Holmberg et al. | 349/40 |

*Primary Examiner*—William L. Sikes
*Assistant Examiner*—Toan Ton
*Attorney, Agent, or Firm*—Myers Bigel Sibley & Sajovec, P.A.

[57] ABSTRACT

Methods of manufacturing liquid crystal display devices with reduced susceptibility to electrostatic discharge faults include delaying the removal of an electrostatic shorting bar from a liquid crystal display substrate until after a display driver has been electrically coupled to the control lines (e.g., data and gate lines) on the display substrate. Thus, in contrast to the prior art, electrostatic discharge faults can also be prevented during the step of electrically coupling display drivers to the display substrate. A preferred method includes the steps of forming a first substrate comprising a thin-film transistor display region, a plurality of data and gate lines coupled to the display region and an electrostatic shorting bar electrically interconnecting the data and gate lines together, and then electrically connecting a second substrate (e.g., printed circuit board) comprising a display driver circuit, before electrically disconnecting the electrostatic shorting bar from the plurality of control lines. Here, the step of electrically disconnecting the shorting bar from the control lines is preferably performed by removing the shorting bar from the first substrate using a cutting tool such as a saw or laser. The step of removing the shorting bar is also preferably performed at an edge of the first substrate which extends opposite an edge to which the second substrate (containing the driver circuit) is attached.

6 Claims, 5 Drawing Sheets

METHODS OF MANUFACTURING LIQUID CRYSTAL DISPLAY DEVICES WITH REDUCED SUSCEPTIBILITY TO ELECTROSTATIC DISCHARGE FAULTS

FIELD OF THE INVENTION

The present invention relates to liquid crystal display devices, and more particularly to methods of manufacturing liquid crystal display devices and devices manufactured thereby.

BACKGROUND OF THE INVENTION

In order to minimize the space required by display devices, research into the development of various flat panel display devices such as LCD display devices, plasma display panels (PDP) and electro-luminescence displays (EL), has been undertaken to displace larger cathode-ray tube displays (CRT) as the most commonly used display devices. Particularly, in the case of LCD display devices, liquid crystal technology has been explored because the optical characteristics of liquid crystal material can be controlled in response to changes in electric fields applied thereto.

At present, the dominant methods for fabricating liquid crystal display devices (LCD) and panels are methods based on amorphous silicon (a-Si) thin film transistor (TFT) technologies. Using these technologies, high quality image displays of substantial size can be fabricated using low temperature processes. As will be understood by those skilled in the art, conventional LCD devices typically include a transparent (e.g., glass) substrate with an array of thin film transistors thereon, pixel electrodes, orthogonal gate and data lines, a color filter substrate and liquid crystal material between the transparent substrate and color filter substrate. The use of a-Si TFT technology typically also requires the use of separate peripheral integrated circuitry (e.g., driver circuits) to drive the gates and sources (i.e., data inputs) of the TFTs in the array. Therefore, there is typically provided a large number of pads for connecting the gate lines (which are coupled to the gates of the TFTs) and data lines (which are coupled to the sources of the TFTs) to the peripheral drive circuitry.

Unfortunately, the above described liquid crystal display devices are susceptible to electrostatic discharge faults which may be generated during manufacture by manufacturing personnel and equipment. To protect against electrostatic discharge faults, electrostatic shorting bars have been used to protect display devices. In particular, FIGS. 1A–1D illustrate plan views of intermediate structures illustrating a method of manufacturing a liquid crystal display device which includes the use of electrostatic shorting bars. For example, FIG. 1A illustrates a first substrate 3 comprising an array of TFT LCD display cells therein, a plurality of gate lines 1 interconnecting each of the gate electrodes of TFTs in each row of display cells and a plurality of data lines 2 interconnecting each of the source regions of TFTs in each column of display cells. Gate pads 1' and data pads 2' are also provided at first ends of the gate lines 1 and data lines 2. To reduce electrostatic discharge faults, an electrostatic shorting bar 5 is provided adjacent the top and left-side edges of the first substrate 3. As illustrated, the electrostatic shorting bar 5 electrically interconnects all of the gate pads 1' and data pads 2' together.

Referring now to FIG. 1 B, the electrostatic shorting bar 5 provides electrostatic discharge protection during the step of attaching a color filter substrate 4 to the first substrate 3. Then, as illustrated by FIG. 1C, the electrostatic shorting bar 5 is removed from the first substrate 3 using a cutting saw or laser. Finally, as illustrated by FIG. 1D, printed circuit boards 7 (PCB) with gate and data line driver circuits, are attached to the gate pads 1' and data pads 2' by bonding tape using a tape automated bonding (TAB) technique. Unfortunately, this step of attaching the PCBs 7 the first substrate 3 is susceptible to the generation of electrostatic discharge faults. Yet, during this final step, no electrostatic shorting bar 5 is provided to prevent such faults. Thus, notwithstanding the above described use of electrostatic shorting bars, there continues to be a need for methods of manufacturing liquid crystal display devices which are less susceptible to electrostatic discharge faults.

SUMMARY OF THE INVENTION

It is therefore an object of the present invention to provide improved methods of manufacturing liquid crystal display devices and display devices formed thereby.

It is another object of the present invention to provide methods of manufacturing liquid crystal display devices free from electrostatic discharge faults and defects.

These and other objects, features and advantages of the present invention are provided by methods of manufacturing liquid crystal display devices which include delaying the removal of an electrostatic shorting bar from a liquid crystal display substrate until after a display driver has been electrically coupled to the control lines (e.g., data and gate lines) on the display substrate. Thus, in contrast to the prior art, electrostatic discharge faults can also be prevented during the step of electrically coupling display drivers to the display substrate.

In particular, according to one embodiment of the present invention, a method of manufacturing a liquid crystal display device includes the steps of forming a first substrate comprising a thin-film transistor display region, a plurality of data and gate lines coupled to the display region and an electrostatic shorting bar electrically interconnecting the data and gate lines together, and then electrically connecting a second substrate (e.g., printed circuit board) comprising a display driver circuit, before electrically disconnecting the electrostatic shorting bar from the plurality of control lines. Here, the step of electrically disconnecting the shorting bar from the control lines is preferably performed by removing the shorting bar from the first substrate using a cutting tool such as a saw or laser. The step of removing the shorting bar is also preferably performed at an edge of the first substrate which extends opposite an edge to which the second substrate (containing the driver circuit) is attached.

DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1A:
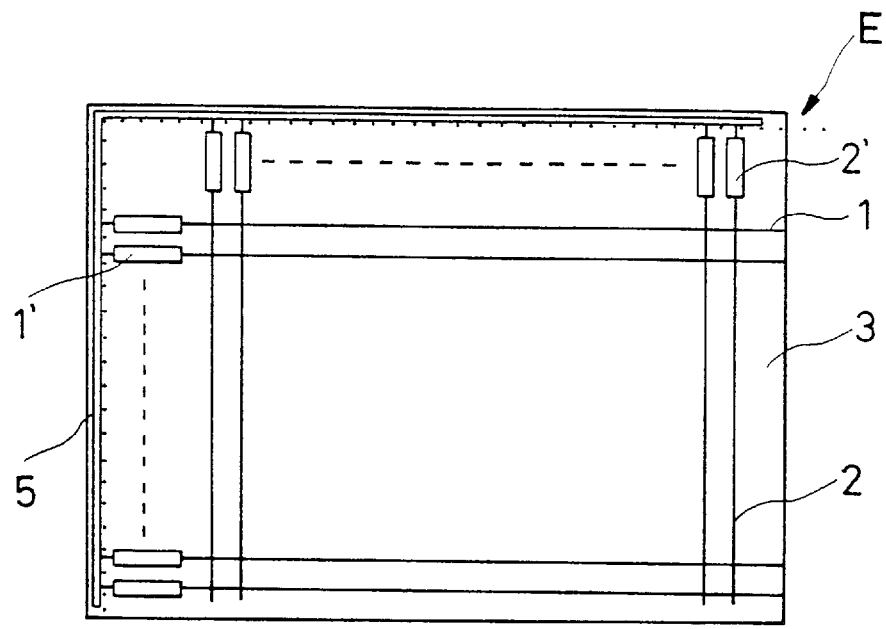
FIGS. 1A–1D illustrate plan views of intermediate structures illustrating a method of manufacturing a liquid crystal display device according to the prior art.
Figure 1B:
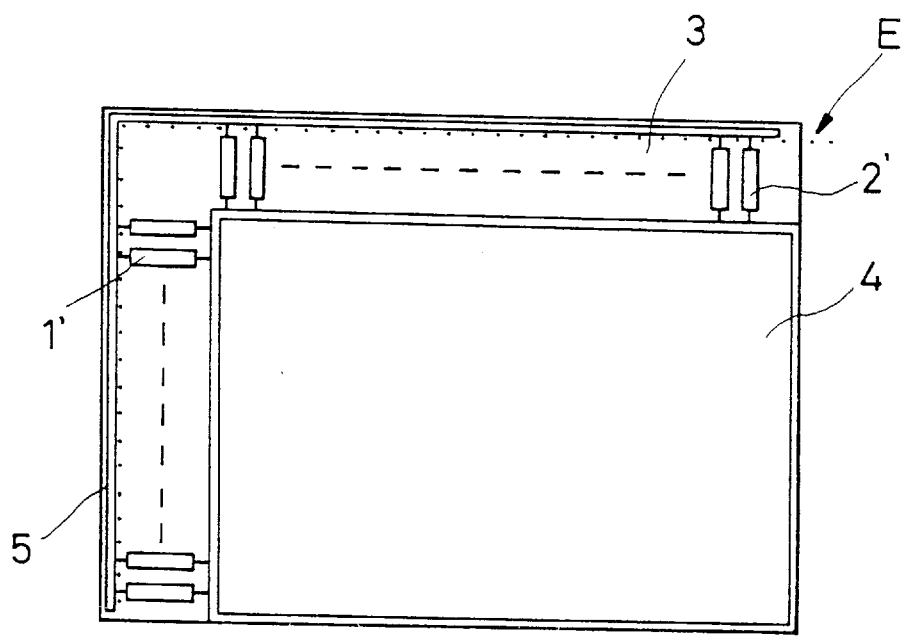
Figure 1C:
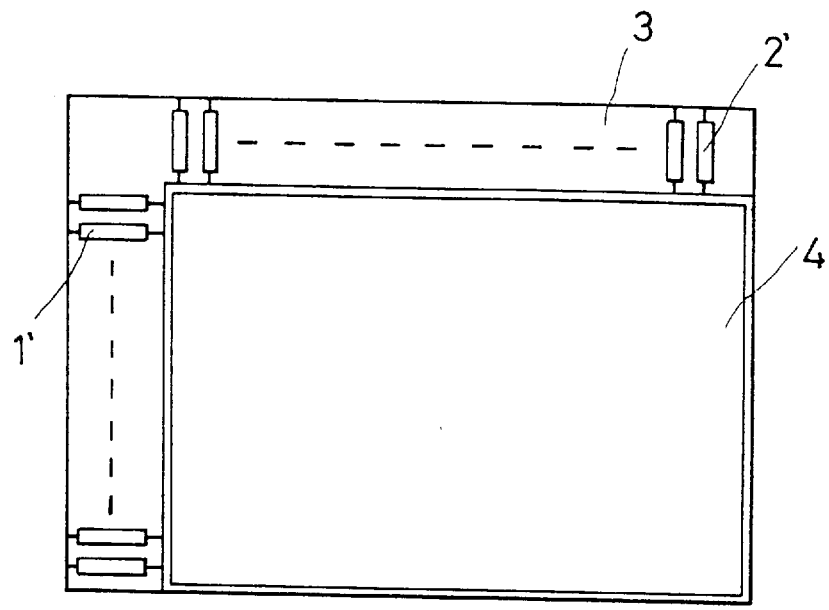
Figure 1D:
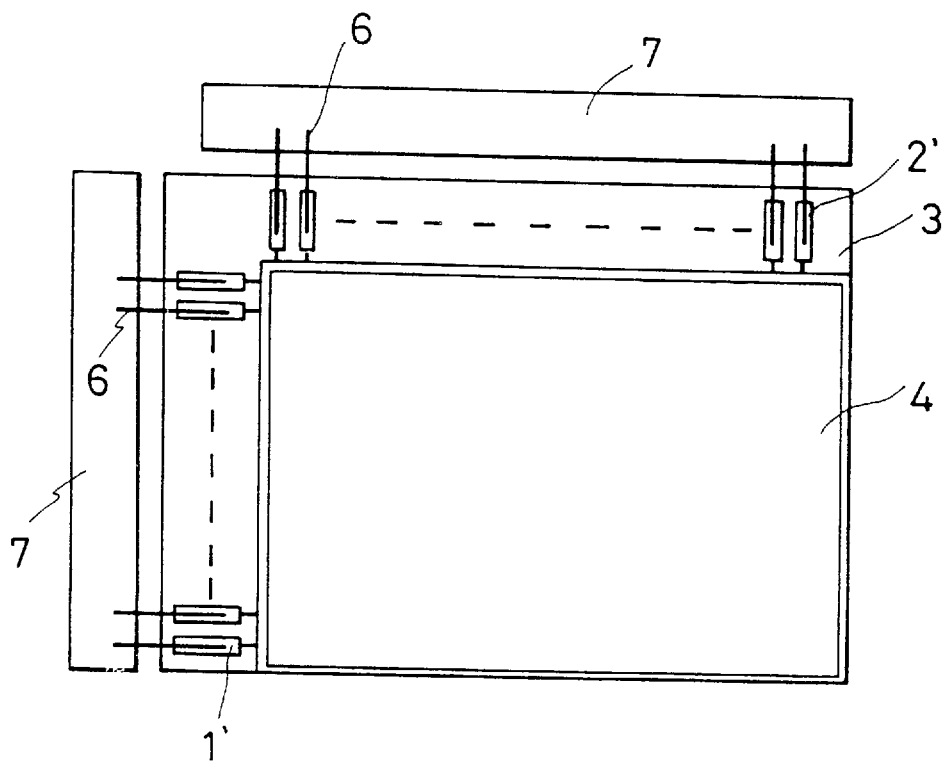
Figure 2A:
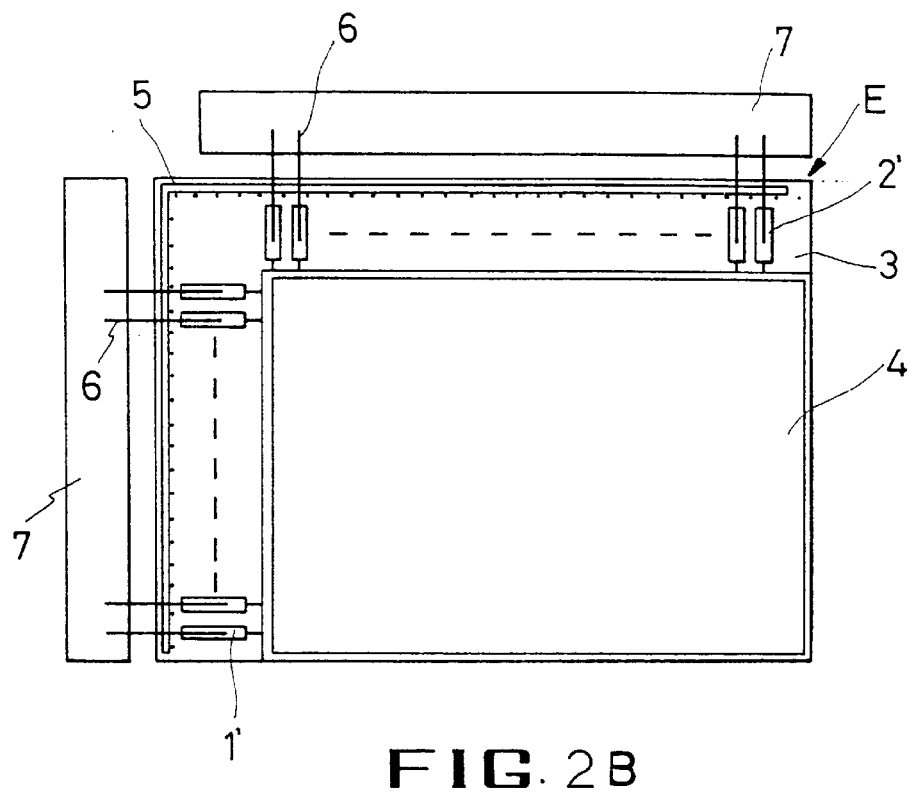
FIGS. 2A–2B illustrate plan views of intermediate structures illustrating a method of manufacturing a liquid crystal display device according to a first embodiment of the present invention.
Figure 2B:
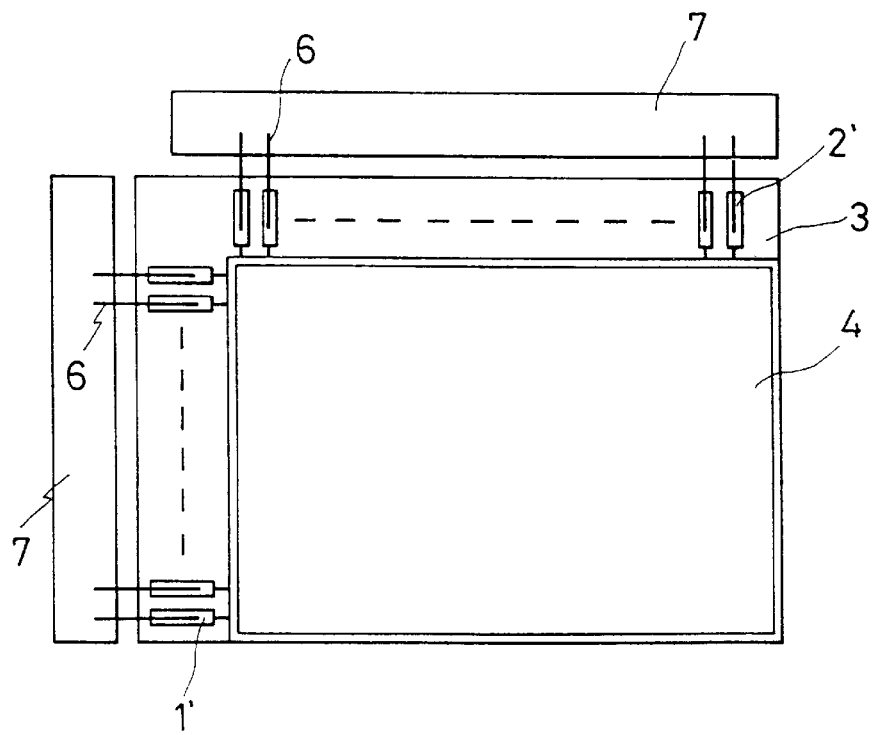

Referring now to FIGS. 2A–2B, a method of manufacturing a liquid crystal display device according to a first embodiment of the present invention will be described. In particular, FIG. 2A illustrates a first substrate 3 comprising a two-dimensional array of thin film transistors (TFT) in a display region thereof and a color filter substrate 4 mounted opposite the array of TFTs. A plurality of gate pads 1' and data pads 2' (i.e., control pads) are also provided on the first substrate 3. As illustrated, the gate pads 1' are connected to respective gate lines 1 which extend across the TFT array in a first direction (illustrated as left-to-right) and the data pads 2' are connected to respective data lines 2 which extend in a second orthogonal direction (illustrated as bottom-to-top). These gate and data lines collectively form a plurality of control lines. In addition, printed circuit boards 7 (PCBs) containing data line and gate line driver circuits are also electrically coupled to the data pads 2' and gate pads 1' by bonding tape 6. Thus, conventional tape automated bonding (TAB) techniques may be used to connect the driver circuits to the first substrate 3.

According to a preferred aspect of the present invention, an electrostatic shorting bar 5 is provided on the first substrate 3. This electrostatic shorting bar 5 electrically interconnects all the data lines 2 and gate lines 1 together to reduce the occurrence of electrostatic discharge faults during manufacture. As illustrated, this electrostatic shorting bar 5 extends adjacent the top and left side edges ("E") of the first substrate 1. Referring now to FIG. 2B, the electrostatic shorting bar 5 of FIG. 2A is then removed from the top and left-side edges of the first substrate 1 after the driver circuits have been electrically coupled to the first substrate 1 at the top and left-side edges. Preferably, the electrostatic shorting bar 5 is removed by cutting away the portion of the first substrate 3 on which the shorting bar 5 is formed, using a laser. In particular, a laser can be used to selectively remove the shorting bar 5 from the first substrate 3, and at the same time preserve the electrical connections between the printed circuit boards 7 (second substrate) and the gate and data pads 1' and 2'.

Figure 3A:
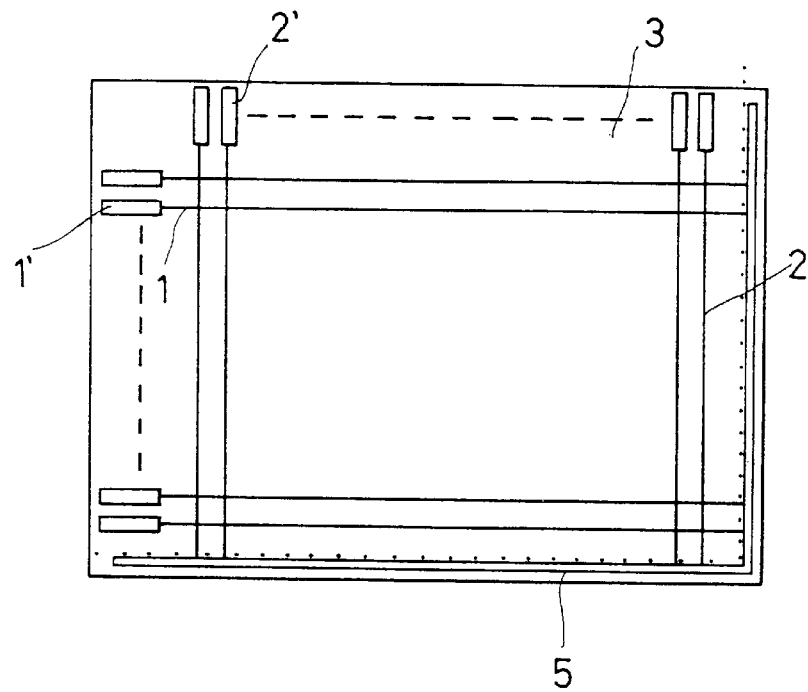
FIGS. 3A–3D illustrate plan views of intermediate structures illustrating a method of manufacturing a liquid crystal display device according to a second embodiment of the present invention.

Referring now to FIGS. 3A–3D, a method of manufacturing a liquid crystal display device according to a second embodiment of the present invention will be described. In particular, FIG. 3A illustrates a first substrate 3 comprising a two-dimensional array of thin-film transistors (TFT) in a display region thereof and a plurality of gate lines 1 and data lines 2. As illustrated, gate pads 1' are connected to respective gate lines 1 which extend across the TFT array in a first direction (illustrated as left-to-right) and data pads 2' are connected to respective data lines 2 which extend in a second orthogonal direction (illustrated as bottom-to-top). These gate and data lines 1 and 2 collectively form a plurality of control lines. An electrostatic shorting bar 5 is also provided on the first substrate 3. This electrostatic shorting bar 5 electrically interconnects all the data lines 2 and gate lines 1 together to reduce the occurrence of electrostatic discharge faults during manufacture. As illustrated, this electrostatic shorting bar 5 extends adjacent the bottom and right side edges ("C") of the first substrate 1.

Figure 3B:
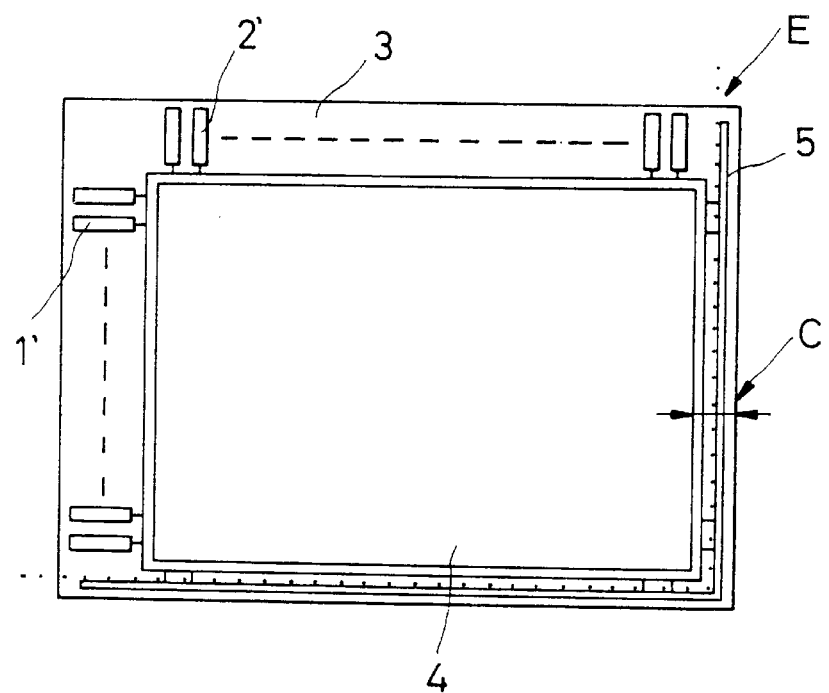

Referring now to FIG. 3B, a color filter substrate 4 is then mounted to the first substrate 3. In particular, the color filter substrate 4 is mounted opposite the array of TFTs and is spaced from the bottom and right side edges of the first substrate 3 by a predetermined distance (e.g., 0.3–0.5 mm). As illustrated, the electrostatic shorting bar 5 extends in the space between the edges "C" of the first substrate 3 and the respective edges of the color filter substrate 4. As illustrated best by FIG. 3C, printed circuit boards 7 (PCBs) containing data line and gate line driver circuits are then electrically coupled to the data pads 2' and gate pads 1' by bonding tape 6 to complete the display device. Conventional tape automated bonding (TAB) techniques may be used to connect the printed circuit boards 7 to the first substrate 3. Thus, during the step of electrically coupling the printed circuit boards 7 to the first substrate 3, electrostatic discharge protection is provided by the electrostatic shorting bar 5.

Figure 3C:
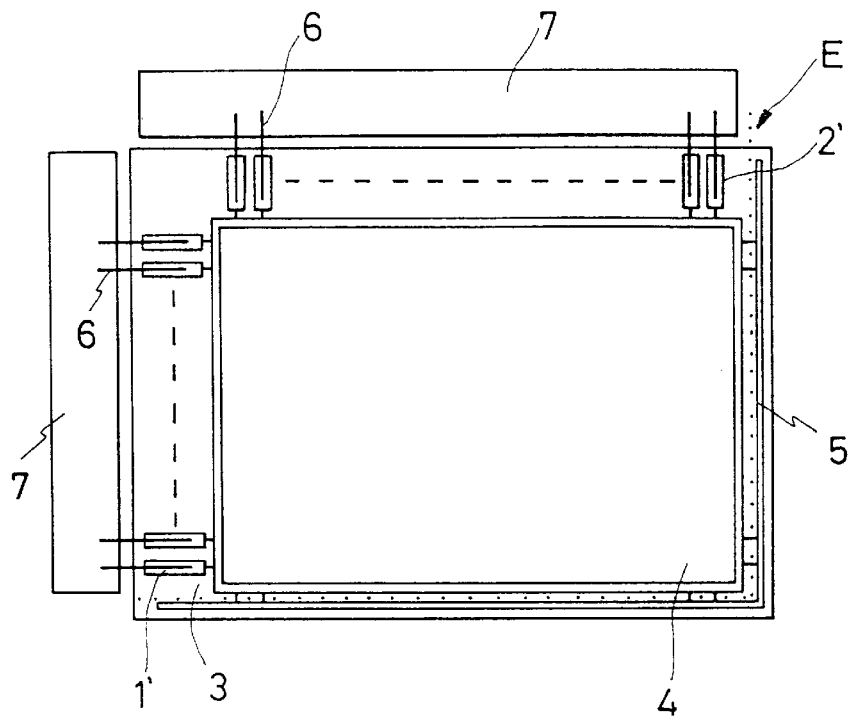
Figure 3D:
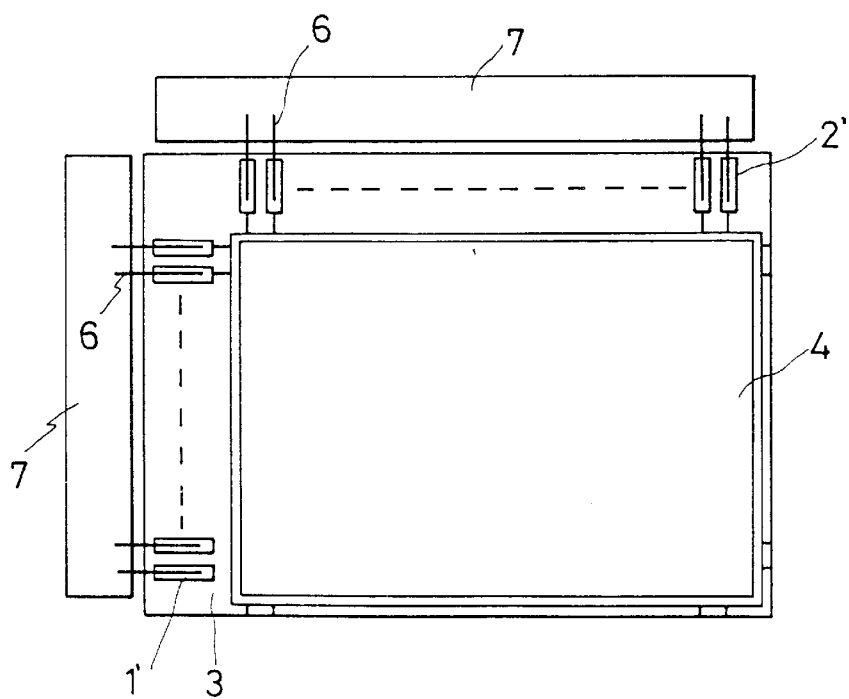

Referring now to FIG. 3D, the electrostatic shorting bar 5 of FIGS. 3A–3C is then removed from the bottom and right-side edges of the first substrate 3 after the driver circuits have been electrically coupled to the first substrate 3 at the top and left-side edges. Here, the electrostatic shorting bar 5 may be removed by cutting away the portion of the first substrate 3 on which the shorting bar 5 is formed, using a laser or a cutting saw such as a grinding wheel. According to the present invention, electrostatic discharge faults can be prevented during the step of electrically coupling display drivers to the display substrate, by delaying the removal of an electrostatic shorting bar from a liquid crystal display substrate until after a display driver has been electrically coupled to the control lines.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A liquid crystal display device, comprising:
    a substrate having an array of thin-film transistors therein;
    a plurality of data and gate lines electrically coupled to said array of thin-film transistors, said plurality of data and gate lines having first and second opposing ends adjacent respective first and second opposing edges of said thin-film transistor substrate;
    input pads electrically connected to the first ends of said plurality of data and gate lines; and
    an electrostatic shorting bar electrically connecting the second ends of said plurality of data and gate lines together.

2. The display device of claim 1, further comprising a display driver circuit electrically coupled to said input pads by bonding tape extending adjacent the first edge of said substrate.

3. A method of manufacturing a liquid crystal display device, comprising the steps of:
    forming a first substrate which has first and second opposing edges, a display region, a plurality of control lines electrically coupled to the display region and an electrostatic shorting bar electrically connecting the plurality of control lines together;
    electrically connecting a second substrate comprising a display driver circuit to the plurality of control lines, at a portion of the first substrate extending adjacent the first edge; and then
    electrically disconnecting the electrostatic shorting bar from the plurality of control lines by cutting the electrostatic shorting bar from the first substrate using a cutting tool selected from the group consisting of cutting saws and lasers.

4. The method of claim 3, wherein the electrostatic shorting bar electrically connects the plurality of control lines together adjacent the second edge.

5. The method of claim 3, wherein the electrostatic shorting bar electrically connects the plurality of control lines together adjacent the first edge.

6. The method of claim 3, wherein the plurality of control lines include a plurality of gate lines extending in a first direction across the first substrate and a plurality of data lines extending in a second direction across the first substrate which is orthogonal to the first direction; wherein the gate and data lines have respective first and second opposing ends; wherein the electrostatic shorting bar extends across the first substrate in both the first and second directions and electrically connects the second ends of the gate and data lines together; and wherein said electrically connecting step comprises electrically connecting the second substrate to the first ends of the gate and data lines.

* * * * *